US012331946B2

United States Patent
Wada et al.

(10) Patent No.: US 12,331,946 B2
(45) Date of Patent: Jun. 17, 2025

(54) AIR-CONDITIONING SYSTEM (71) Applicant: Mitsubishi Electric Corporation, Tokyo (JP)

(72) Inventors: Nobuhiro Wada, Tokyo (JP); Naofumi Takenaka, Tokyo (JP); Yuji Motomura, Tokyo (JP); Takuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 449 days.

(21) Appl. No.: 17/924,512

(22) PCT Filed: Aug. 3, 2020

(86) PCT No.: PCT/JP2020/029690
§ 371 (c)(1),
(2) Date: Nov. 10, 2022

(87) PCT Pub. No.: WO2022/029846
PCT Pub. Date: Feb. 10, 2022

(65) Prior Publication Data
US 2023/0175723 A1    Jun. 8, 2023

(51) Int. Cl.
*F24F 11/49* (2018.01)
*G05B 19/042* (2006.01)

(52) U.S. Cl.
CPC ............ *F24F 11/49* (2018.01); *G05B 19/042* (2013.01); *G05B 2219/2614* (2013.01)

(58) Field of Classification Search
CPC ... F24F 11/49; G05B 19/042; G05B 2219/261
See application file for complete search history.

(56) References Cited

U.S. PATENT DOCUMENTS

| | | | |
|---|---|---|---|
| 2011/0192189 A1* | 8/2011 | Morimoto | F24F 3/06 62/513 |
| 2013/0305758 A1* | 11/2013 | Matsui | F25B 49/005 62/129 |
| 2022/0163239 A1 | 5/2022 | Nishio et al. | |

FOREIGN PATENT DOCUMENTS

| | | | |
|---|---|---|---|
| JP | 3071135 B2 * | 5/1997 | |
| JP | 6678837 B1 | 4/2020 | |

OTHER PUBLICATIONS

International Search Report dated Oct. 6, 2020, issued in corresponding International Patent Application No. PCT/JP2020/029690 (and English Machine Translation).

* cited by examiner

*Primary Examiner* — Michael W Choi
(74) *Attorney, Agent, or Firm* — Posz Law Group, PLC (57) ABSTRACT

An air-conditioning system comprising: a heat source side unit; a use side unit; a relay unit; a refrigerant circuit; a water circuit; a controller configured to operate in a trial operation mode, and configured to operate in a normal operation mode; a first setting unit; a second setting unit; and a third setting unit, wherein the controller is configured to invalidate an error that occurs in the water circuit when the trial operation mode is set, a target for the trial operation in the trial operation mode is set to the refrigerant circuit, and invalidation of an error is set to be active, and invalidate an error that occurs in the refrigerant circuit when the trial operation mode is set, a target for the trial operation in the trial operation mode is set to the water circuit, and invalidation of an error is set to be active.

3 Claims, 5 Drawing Sheets

FIG. 13

AIR-CONDITIONING SYSTEM

CROSS REFERENCE TO RELATED APPLICATION

This application is a U.S. national stage application of PCT/JP2020/029690 filed on Aug. 3, 2020, the contents of which are incorporated herein by reference.

TECHNICAL FIELD

The present disclosure relates to an air-conditioning system provided with a refrigerant circuit and a water circuit.

BACKGROUND ART

Hitherto, an air-conditioning system has been known that includes a refrigerant circuit in which an outdoor unit and a relay unit are connected by a pipe and through which refrigerant circulates, and a water circuit in which the relay unit and an indoor unit are connected by a pipe and through which water circulates (see Patent Literature 1, for example).

In such an air-conditioning system, the refrigerant circuit and the water circuit are required to be subjected to a trial operation. As for a contractor of an installation work, a contractor for the refrigerant circuit and a contractor for the water circuit may often differ.

CITATION LIST

Patent Literature

Patent Literature 1: Japan Patent No. 6678837

In the related-art air-conditioning systems such as the one disclosed in Patent Literature 1, in order to avoid unconnected wiring, incorrect wiring, setting errors, and other troubles, when these troubles occur, an error message indicating an abnormal state is displayed, and an operation is not allowed to be performed until the error is eliminated. Therefore, if the installation work of both the refrigerant circuit and the water circuit has not been completed, an error occurs on a circuit that has not been installed, and hence, a trial operation cannot be conducted. Therefore, if the installation work is performed by different contractors; specifically a contractor for the refrigerant circuit and a contractor for the water circuit are different, the installation work must be performed in such a manner that, before performing a trial operation, the contractor for one circuit must wait until the contractor for the other circuit has completed the installation work. In related-art air-conditioning systems, there is a problem that a trial operation cannot be performed separately for the refrigerant circuit and the water circuit.

The present disclosure has been made to solve the above-mentioned problem, and an object thereof is to provide an air-conditioning system capable of performing a trial operation separately for the refrigerant circuit and the water circuit.

Solution to Problem

An air-conditioning system according to one embodiment of the present disclosure comprises: a heat source side unit configured to heat or cool refrigerant; a use side unit configured to heat or cool water; a relay unit configured to cause heat exchange to be performed between the refrigerant and the water; a refrigerant circuit in which the heat source side unit and the relay unit are connected by a refrigerant pipe to allow the refrigerant to circulate; a water circuit in which the use side unit and the relay unit are connected by a water pipe to allow the water to circulate; a controller configured to operate in a trial operation mode in which a trial operation is performed when the refrigerant circuit or the water circuit is installed, and configured to operate in a normal operation mode in which a normal operation is performed; a first setting unit configured to switch the trial operation mode and the normal operation; a second setting unit configured to switch a target for the trial operation in the trial operation mode between the refrigerant circuit and the water circuit; and a third setting unit configured to switch activation and non-activation of invalidation of an error indicating an abnormal state, wherein the controller is configured to invalidate an error that occurs in the water circuit when the trial operation mode is set by the first setting unit, a target for the trial operation in the trial operation mode is set to the refrigerant circuit by the second setting unit, and invalidation of an error is set to be active by the third setting unit, and invalidate an error that occurs in the refrigerant circuit when the trial operation mode is set by the first setting unit, a target for the trial operation in the trial operation mode is set to the water circuit by the second setting unit, and invalidation of an error is set to be active by the third setting unit.

By the air-conditioning system of the present disclosure, when invalidation of an error is set to be active in the trial operation mode, of the refrigerant circuit and the water circuit, an error that occurs in a circuit that is not a target for the trial operation is invalidated, whereby a trial operation can be performed separately for the refrigerant circuit and the water circuit.

DESCRIPTION OF EMBODIMENTS

Hereinbelow, an embodiment of the present disclosure will be explained with reference to the drawings. Note that the present disclosure is not restricted by the embodiment described below. In the following drawings, the relative size relationships of the components may differ from those of actual ones.

Embodiment

Figure 1:
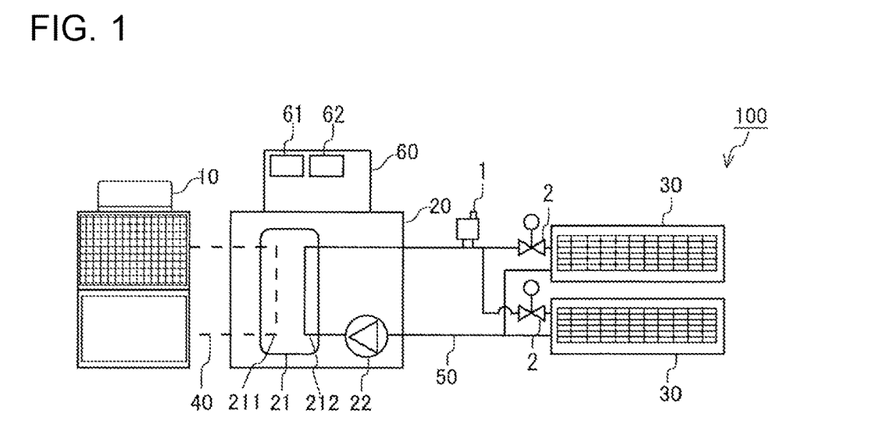
FIG. 1 is a diagram illustrating a configuration of an air-conditioning system according to the present embodiment.
Figure 2:
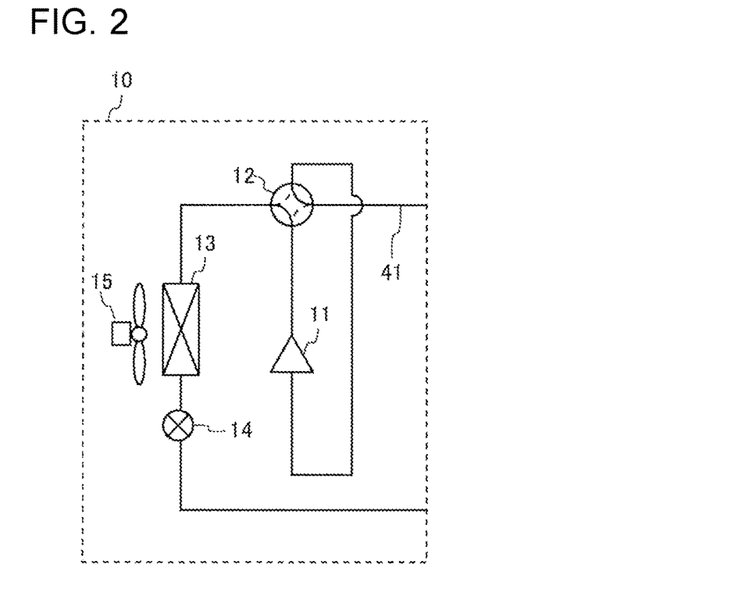
FIG. 2 is a diagram illustrating a configuration of an outdoor unit of the air-conditioning system according to the present embodiment.
Figure 3:
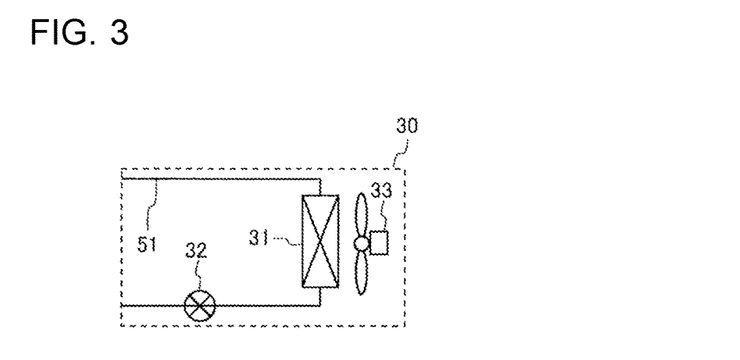
FIG. 3 is a diagram illustrating a configuration of an indoor unit of the air-conditioning system according to the present embodiment.
Figure 4:
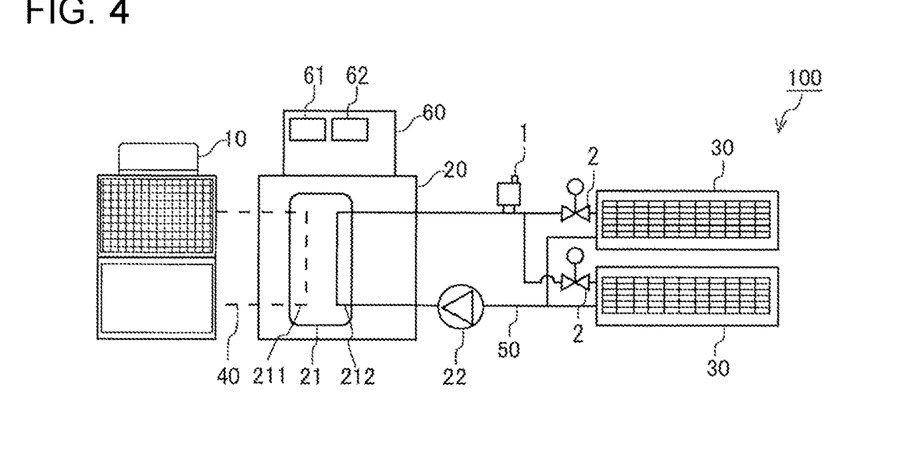
FIG. 4 is a diagram illustrating a configuration of a first modification example of the air-conditioning system according to the present embodiment.
Figure 5:
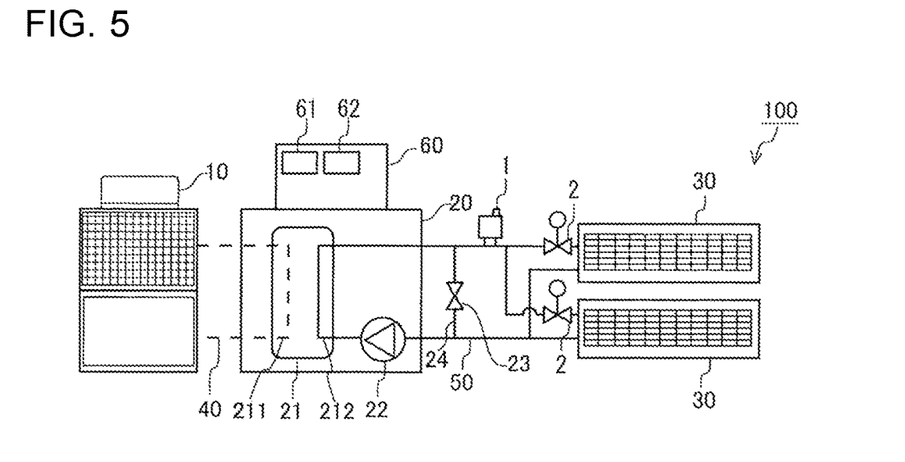
FIG. 5 is a diagram illustrating a configuration of a second modification example of the air-conditioning system according to the present embodiment.
Figure 6:
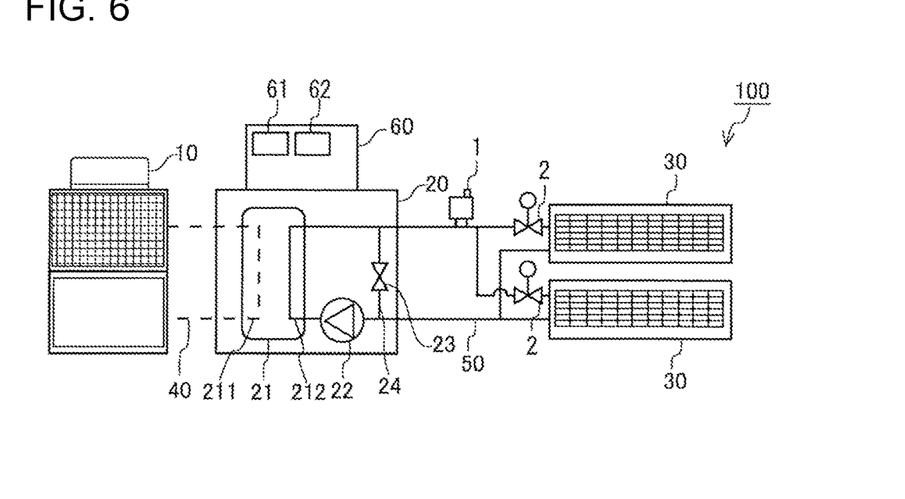
FIG. 6 is a diagram illustrating a configuration of a third modification example of the air-conditioning system according to the present embodiment.
Figure 7:
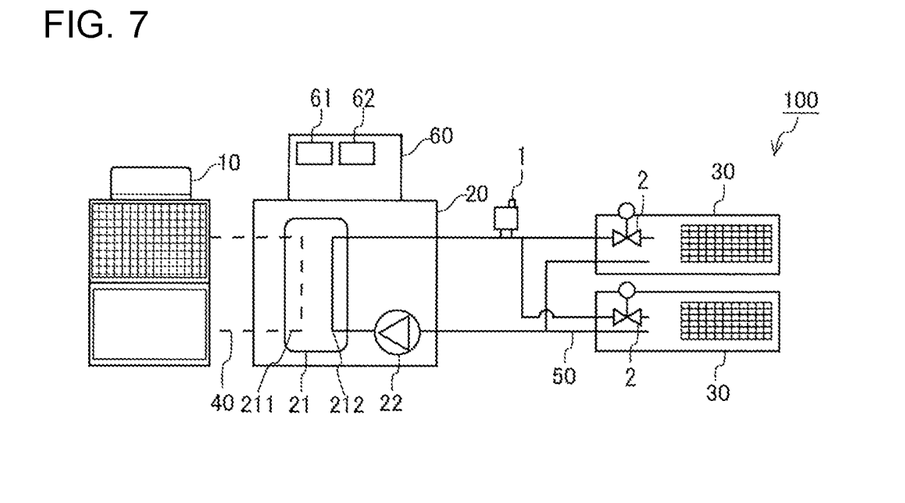
FIG. 7 is a diagram illustrating a configuration of a fourth modification example of the air-conditioning system according to the present embodiment.
Figure 8:
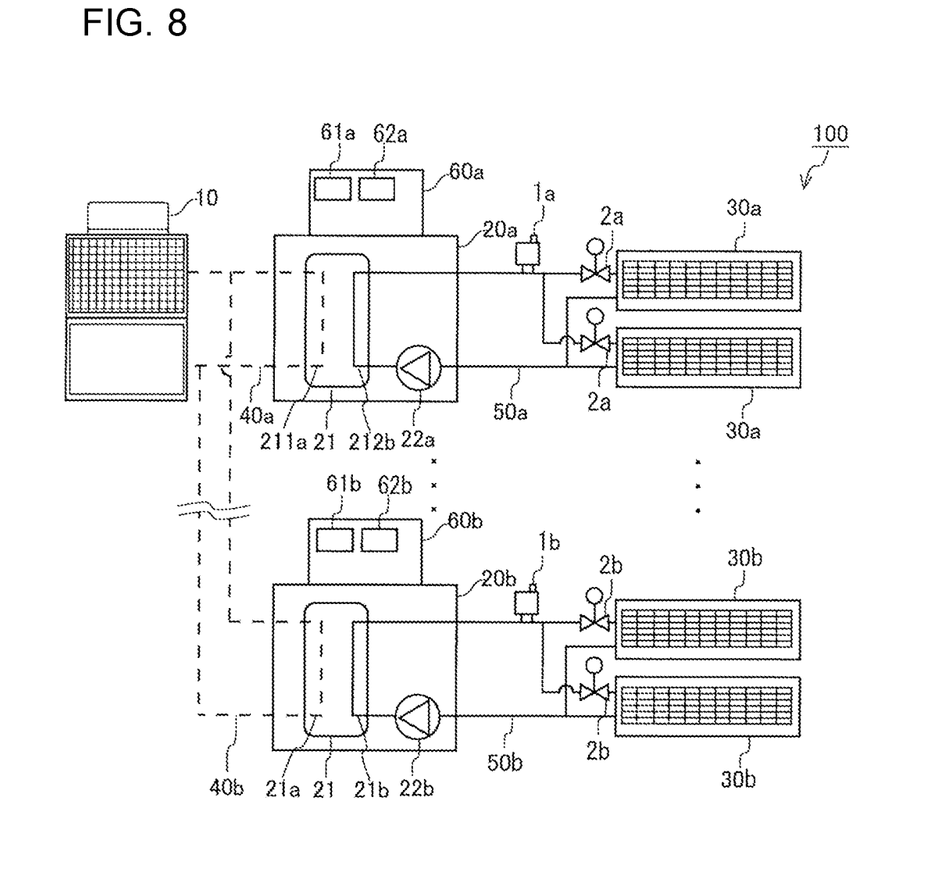
FIG. 8 is a diagram illustrating a configuration of a fifth modification example of the air-conditioning system according to the present embodiment.

FIG. 1 is a diagram illustrating a configuration of an air-conditioning system 100 according to the present embodiment. FIG. 2 is a diagram illustrating a configuration of an outdoor unit 10 of the air-conditioning system 100 according to the present embodiment. FIG. 3 is a diagram illustrating a configuration of an indoor unit 30 of the air-conditioning system 100 according to the present embodiment. FIG. 4 is a diagram illustrating a configuration of a first modification example of the air-conditioning system 100 according to the present embodiment. FIG. 5 is a diagram illustrating a configuration of a second modification example of the air-conditioning system 100 according to the present embodiment. FIG. 6 is a diagram illustrating a configuration of a third modification example of the air-conditioning system 100 according to the present embodiment. FIG. 7 is a diagram illustrating a configuration of a fourth modification example of the air-conditioning system 100 according to the present embodiment. FIG. 8 is a diagram illustrating a configuration of a fifth modification example of the air-conditioning system 100 according to the present embodiment.

The air-conditioning system 100 in the present embodiment includes an outdoor unit 10 that heats or cools refrigerant, indoor units 30 that heat or cool water, and a relay unit 20 that causes heat exchange to be performed between the refrigerant and water. The air-conditioning system 100 includes one outdoor unit 10, one relay unit 20, and two indoor units 30, each as a separate unit. The number of indoor units 30 is not limited to two, but may be one or three or more.

The air-conditioning system 100 includes a refrigerant circuit 40 in which the outdoor unit 10 and the relay 20 are connected by a refrigerant pipe 41 to allow refrigerant to circulate therethrough, and a water circuit 50 in which the indoor unit 30 and the relay 20 are connected by a water pipe 51 to allow water to circulate therethrough. The two indoor units 30 are connected by the relay unit 20 and the water pipe 51 such that they are parallel to each other.

The outdoor unit 10 is, for example, a heat source side unit installed outside of a room that is a space to be air-conditioned and exhausts or supplies heat used for air conditioning to the outside. As illustrated in FIG. 2, the outdoor unit 10 includes a compressor 11, a flow passage switching valve 12, an outdoor heat exchanger 13, and an expansion device 14. Further, the outdoor unit 10 is provided with an outdoor fan 15 which is a blower that blows air to an outdoor heat exchanger 13. Instead of the outdoor unit 10, the relay unit 20 may include an expansion device 14.

The compressor 11 sucks and compresses the refrigerant, and discharges the compressed refrigerant in a high-temperature and high-pressure state. The compressor 11 is, for example, an inverter compressor whose capacity can be adjusted. The flow passage switching valve 12 is, for example, a four-way valve. The flow passage switching valve 12 switches between a refrigerant flow passage in cooling operation for cooling water circulating in the water circuit 50 and a refrigerant flow passage in heating operation for heating water circulating in the water circuit 50. The outdoor heat exchanger 13 causes heat exchange to be performed between outdoor air and refrigerant. Here, the outdoor heat exchanger 13 functions as a condenser during cooling operation and functions as an evaporator during heating operation. The expansion device 14 is a device having a function as a pressure-reducing valve or an expansion valve that reduces the pressure and expands the refrigerant. The outdoor fan 15 supplies outdoor air to the outdoor heat exchanger 13.

In a building, the relay unit 20 is installed in a space that is not to be air-conditioned and is different from a space to be air-conditioned in which the indoor units 30 are installed, for example, and causes heat exchange to be performed between refrigerant and water. The relay unit 20 has an intermediate heat exchanger 21, a pump 22, and a control box 60.

The intermediate heat exchanger 21 has a first heat transfer unit 211 that allows refrigerant to pass through and a second heat transfer unit 212 that allows water to pass through, and causes heat exchange to be performed between mediums, i.e., refrigerant and water. In the present embodiment, the intermediate heat exchanger 21 functions as a condenser in heating operation and allows the refrigerant to reject heat, and thereby heat the water. On the other hand, the intermediate heat exchanger 21 functions as an evaporator in cooling operation and allows the refrigerant to receive heat, and thereby cool the water.

The pump 22 is a heat medium transfer device that sucks and pressurizes water, and delivers and circulates the water through the water circuit 50. The pump 22 can vary a discharge flow rate, which is the flow rate at which water is delivered, by varying a rotation speed of a built-in motor (not illustrated) within a constant range. As illustrated in FIG. 4, the pump 22 may be provided outside of the relay unit 20, instead of being provided inside of the relay unit 20.

As illustrated in FIGS. 5 and 6, the water circuit 50 may have a bypass pipe 24 configured to allow water to be bypassed from the discharge side to the suction side of the pump 22, and a bypass valve 23 that is provided in the bypass pipe 24 to allow or block the flow of water. The bypass pipe 24 and the bypass valve 23 are provided to adjust the flow rate of water. Then, when a relationship [flow rate of water to flow to the indoor unit 30]<[flow rate of water flowed at the lowest frequency of the pump 22] is satisfied, by opening the bypass valve 23 to flow water to the bypass pipe 24, the flow rate of water flowed to the indoor unit 30 can be adjusted.

Here, the bypass valve 23 may be an on-off valve that switches a valve to either a fully open state or a fully closed state, or may be a valve that adjusts the opening degree stepwise between a fully closed state and a fully open state to adjust the flow rate. Further, the bypass valve 23 and the bypass pipe 24 may be provided outside the relay unit 20 as illustrated in FIG. 5, or may be provided inside the relay unit 20 as illustrated in FIG. 6.

In the control box 60, a controller 61 configured to control each of the refrigerant circuit 40 and the water circuit 50, a setting unit 62 configured to switch various settings, and other components are accommodated. The controller 61 and the setting unit 62 will be described later.

The indoor units 30 are, for example, a use side unit installed inside a room that is a space to be air-conditioned and supplies conditioned air to the room. As illustrated in FIG. 3, the indoor unit 30 has an indoor heat exchanger 31 and a flow rate control device 32. Further, the indoor unit 30 is provided with an indoor fan 33, which is a blower that blows air to the indoor heat exchanger 31.

The indoor heat exchanger 31 causes heat exchange to be performed between indoor air to be air-conditioned and water, and generates conditioned air to be supplied to a space to be air-conditioned. Indoor air is blown to the indoor heat exchanger 31 from the indoor fan 33. The flow rate control device 32 adjusts the flow rate of water flowing through the indoor heat exchanger 31. The flow rate control device 32 is, for example, an electromagnetic on-off valve. The flow rate control device 32 is operated by signals sent from the controller 61. The flow rate control device 32 may be an on-off valve that switches the valve to either a fully open state or a fully closed state. Further, the flow rate control device 32 may be a valve capable of adjusting the flow rate by adjusting the opening degree stepwise between a fully closed state and a fully open state.

The refrigerant circuit 40 includes the compressor 11, the flow passage switching valve 12, the outdoor heat exchanger 13, the expansion device 14, and the first heat transfer unit 211 of the intermediate heat exchanger 21 being connected sequentially by the a refrigerant pipe 41. Further, the water circuit 50 includes the pump 22, the second heat transfer unit 212 of the intermediate heat exchanger 21, the indoor heat exchanger 31, and the flow rate control device 32 being connected sequentially by the water pipe 51.

As illustrated in FIG. 1, the water circuit 50 is provided with an air vent valve 1 and flow switches 2. The air vent valve 1 is located in the water circuit 50 where air tends to accumulate, i.e., at the highest position. The air vent valve 1 mainly vents the air accumulated in the water circuit 50 when water is filled in the water circuit 50 at the time of installation. The flow switches 2 detect the flow of water in the water circuit 50. The same number of the flow switches 2 as the number of the indoor units 30 are provided, and each of them detects the flow of water to the corresponding indoor unit 30. As illustrated in FIG. 7, each of the flow switches 2 may be provided inside the indoor unit 30 instead of being provided outside the indoor unit 30.

Further, as illustrated in FIG. 8, the air-conditioning system 100 has a plurality of relay units 20 (relay unit 20a and relay unit 20b in FIG. 8), and the plurality of relay units 20 are connected by the outdoor unit 10 and the refrigerant pipe 41 such that they are arranged in parallel with each other. In FIG. 8, "a" is attached to a component related to the relay unit 20a, and "b" is attached to a component related to the relay unit 20b.

Figure 9:
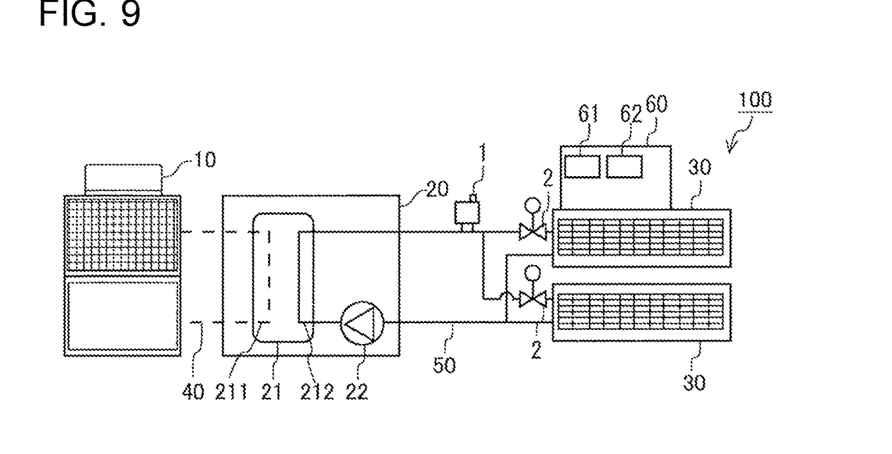
FIG. 9 is a diagram illustrating a configuration of a sixth modification example of the air-conditioning system according to the present embodiment.
Figure 10:
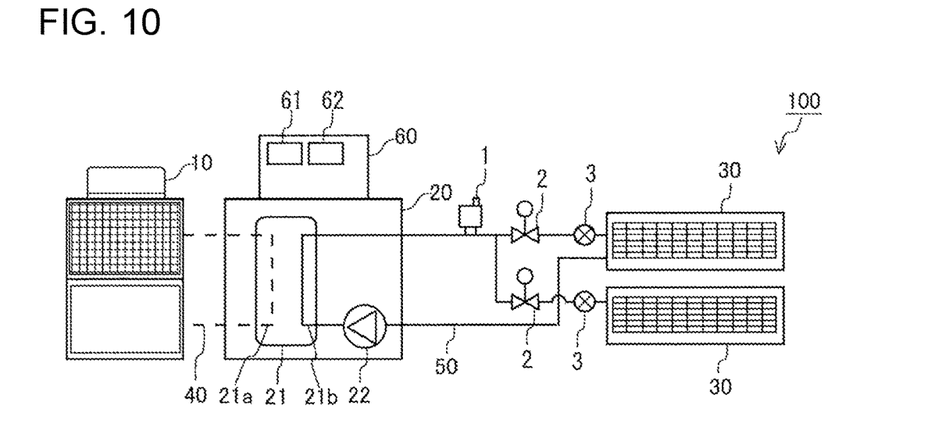
FIG. 10 is a diagram illustrating a configuration of a seventh modification example of the air-conditioning system according to the present embodiment.
Figure 11:
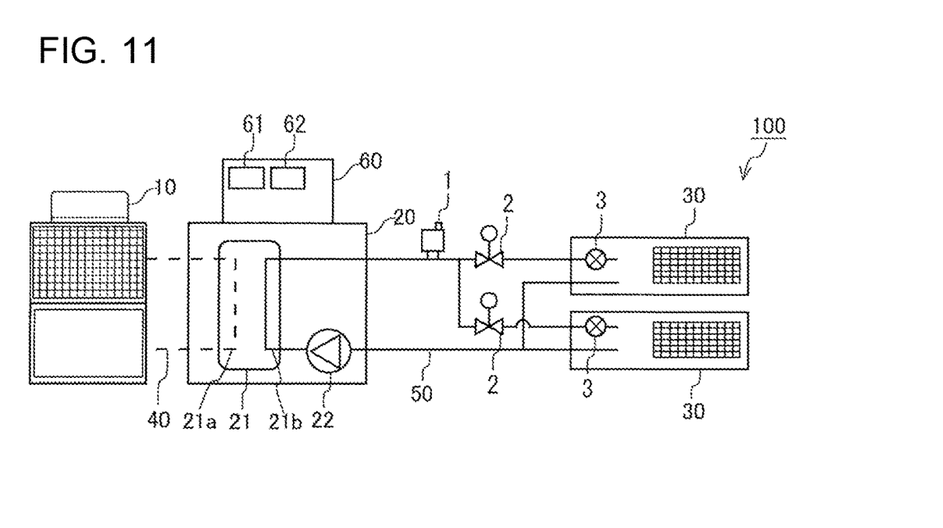
FIG. 11 is a diagram illustrating a configuration of an eighth modification example of the air-conditioning system according to the present embodiment.
Figure 12:
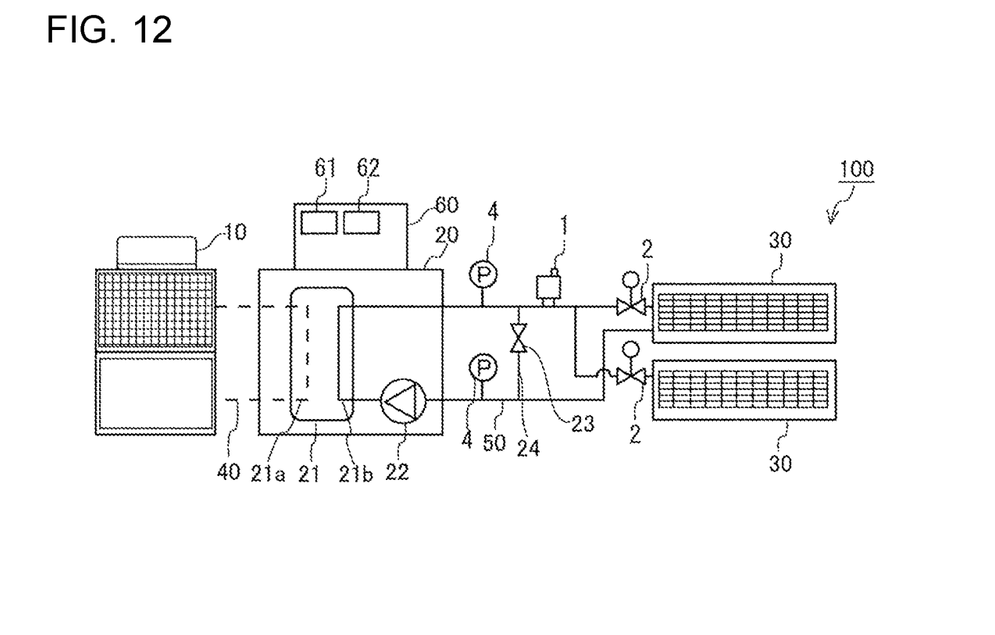
FIG. 12 is a diagram illustrating a configuration of a ninth modification example of the air-conditioning system according to the present embodiment.
Figure 13:
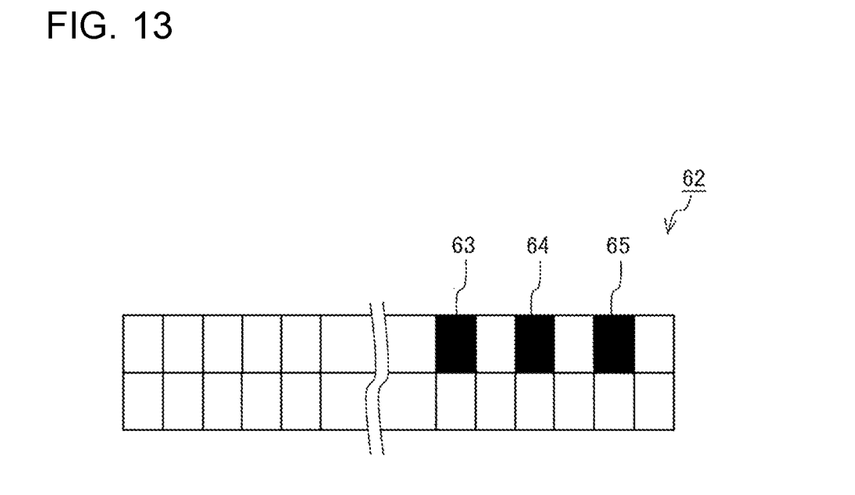
FIG. 13 is a schematic diagram illustrating one example of a setting unit of the air-conditioning system according to the present embodiment.

FIG. 9 is a diagram illustrating a configuration of a sixth modification example of the air-conditioning system 100 according to the present embodiment. FIG. 10 is a diagram illustrating a configuration of a seventh modification example of the air-conditioning system 100 according to the present embodiment. FIG. 11 is a diagram illustrating a configuration of an eighth modification example of the air-conditioning system 100 according to the present embodiment. FIG. 12 is a diagram illustrating a configuration of a ninth modification example of the air-conditioning system 100 according to the present embodiment. FIG. 13 is a schematic view illustrating one example of the setting unit 62 of the air-conditioning system 100 according to the present embodiment.

The controller 61 is, for example, a piece of dedicated hardware or a central processing unit ("CPU"), that is, a central processer, a processing device, a computing device, a microprocessor, a microcomputer, or a processor) that executes a program stored in a memory.

When the controller 61 is a piece of dedicated hardware, the controller 61 corresponds to, for example, a single circuit, a composite circuit, an Application Specific Integrated Circuit ("ASIC"), a Field Programmable Gate Array ("FPGA"), or a combination thereof. Each of the functional units implemented by the controller 61 may be implemented by individual hardware, or each functional unit may be realized by a single piece of hardware.

When the controller 61 is a CPU, each function executed by the controller 61 is realized by software, firmware, or a combination of software and firmware. Software and firmware are described as programs and stored in memory. The CPU implements each function of the controller 61 by reading and executing the program stored in the memory. Here, the memory is a non-volatile or volatile semiconductor memory such as, for example, RAM, ROM, flash memory, EPROM, EEPROM and the like.

It should be noted that, of the functions of the controller 61, some may be implemented by a piece of dedicated hardware, and some may be implemented by software or firmware. As illustrated in FIG. 9, the control box 60 may be provided at the indoor unit 30 instead of being provided at the relay unit 20.

The controller 61 is configured to operate in a trial operation mode in which a trial operation is performed when the refrigerant circuit 40 and the water circuit 50 are installed, and in a normal operation mode in which a normal operation is performed. Here, the trial operation of the refrigerant circuit 40 is a trial operation in which the compressor 11 is operated so as to allow the refrigerant to circulate in the circuit at a constant speed for a certain period of time, and a check for leakage of the refrigerant is performed during this trial operation. Further, the trial operation of the water circuit 50 is a trial operation in which the pump 22 is operated so as to allow water to circulate in the circuit at a constant speed for a certain period of time, and air vent in the water circuit 50 are performed during this trial operation.

As shown in FIG. 10, a flow rate measuring device 3 configured to measure the flow rate of water may be provided in the vicinity of each indoor unit 30 in the water circuit 50. By providing the flow rate measuring device 3 as mentioned above, a rotation speed of the pump 22 required to secure the minimum flow rate to be supplied to each indoor unit 30 can be determined, whereby the required load of each indoor unit 30 can be satisfied. As illustrated in FIG. 11, the flow rate measuring device 3 may be provided in each indoor unit 30 in the water circuit 50 instead of being provided in the vicinity of each indoor unit 30 in the water circuit 50.

When the water circuit 50 is provided with the bypass valve 23 and the bypass pipe 24, as illustrated in FIG. 12, a pressure measuring device 4 configured to measure the pressure of water may be provided between the suction side of the pump 22 and the bypass valve 23, and another pressure measuring device 4 may be provided between the discharge side of the pump 22 and the bypass valve 23. By providing the pressure measuring device 4 in this way, a differential pressure can be measured. Therefore, when the bypass valve 23 is a valve by which the flow rate can be adjusted, the opening degree of the bypass valve 23 is determined during the trial operation of the water circuit 50. By doing so, it is possible to determine an appropriate opening degree of the bypass valve 23 according to the required load.

The setting unit 62 is, for example, a unit of DIP switch as illustrated in FIG. 13, and includes a first setting unit 63 configured to switch between a trial operation mode and a normal operation mode, a second setting unit 64 configured to switch a target for the trial operation in the trial operation mode between the refrigerant circuit 40 and the water circuit 50, and a third setting unit 65 configured to switch between activation and non-activation of invalidation of an error indicating an abnormal state that is not a normal state. Thus, by using a unit of DIP switch for the setting unit 62, no other devices or components are needed for switching, making it easy to set each switching.

The setting unit 62 is not limited to a unit of DIP switch, but can also be one set in a memory by using a PC, for example, as long as it can set each of the above-mentioned switching operations.

The controller 61, when the trial operation mode is set by the first setting unit 63, a target for the trial operation in the trial operation mode is set to the refrigerant circuit 40 by the second setting unit 64, and invalidation of an error is set to be active by the third setting unit 65, invalidates an error that occurs in the water circuit 50. The controller 61, when the trial operation mode is set by the first setting unit 63, a target for the trial operation in the trial operation mode is set to the water circuit 50 by the second setting unit 64, and invalidation of an error is set to be active by the third setting unit 65, invalidates and an error that occurs in the refrigerant circuit 40.

That is, when invalidation of an error is set to be active in the trial operation mode, of the refrigerant circuit 40 and the water circuit 50, the controller 61 invalidates an error that occurs in a circuit that is not a target for the trial operation. Therefore, in the air-conditioning system 100 according to the present embodiment, a trial operation can be performed when the installation work of one of the refrigerant circuit 40 and the water circuit 50 is completed, and the trial operation can be performed separately for the refrigerant circuit 40 and the water circuit 50. As a result, even if the installation work is performed by different contractors for the refrigerant circuit 40 and the water circuit 50, the contractor for one circuit can perform a trial operation without the need of waiting until the other contractor completes the installation work of the other circuit.

The settings of the second setting unit 64 and the third setting unit 65 are valid only in the trial operation mode and are invalid in the normal operation mode. That is, when the normal operation mode is set by the first setting unit 63, the settings of the second setting unit 64 and the third setting unit 65 are ignored. Therefore, even if the setting for invalidation of an error is forgotten be switched from active to non-active after the trial operation is completed, it is possible to prevent the error from being invalidated in the normal operation mode. Further, regarding the error that could not be confirmed because the error is invalidated in the trial operation mode, the invalidation of the error is canceled in the normal operation mode, so that the error can be confirmed in the normal operation mode.

As described above, the air-conditioning system 100 according to the present embodiment includes a heat source side unit that heats or cools refrigerant, a use side unit that heats or cools water, and the relay unit 20 that causes heat exchange to be performed between refrigerant and the water. Further, the air-conditioning system 100 includes the refrigerant circuit 40 in which the heat source side unit and the relay unit 20 are connected by the refrigerant pipe 41 and through which refrigerant circulates and the water circuit 50 in which the use side unit and the relay unit 20 are connected by the water pipe 51 and through which water circulates. Further, the air-conditioning systems 100 includes the controller 61 configured to operate the air-conditioning system 100 in a trial operation mode in which a trial operation is performed when the refrigerant circuit 40 or the water circuit 50 is installed and a normal operation in which a normal operation is performed, a first setting unit 63 configured to switch between the trial operation mode and the normal operation mode, a second setting unit 64 configured to switch a target for the trial operation in the trial operation mode between the refrigerant circuit 40 and the water circuit 50, and a third setting unit 65 configured to switch activation and non-activation of invalidation of an error indicating an abnormal state. Then, the controller 61, when a trial operation mode is set by the first setting unit 63, a target for the trial operation in the trial operation mode is set by the second setting unit 64 to the refrigerant circuit 40, and the invalidation of an error is set to be active by the third setting unit 65, invalidates the error that occurs in the water circuit 50. Then, when a trial operation mode is set by the first setting unit 63, a target for trial operation in the trial operation mode is set by the second setting unit 64 to the water circuit 50, and the invalidation of error is set by the third setting unit to be active, invalidates the error that occurs in the refrigerant circuit 40.

Due to the air-conditioning system 100 according to the present embodiment, when the invalidation of an error is set to be active in the trial operation mode, the error that occurs, of the refrigerant circuit 40 and the water circuit 50, in a circuit that is not a target for the trial operation is invalidated, and hence, the trial operation can be performed separately for the refrigerant circuit 40 and the water circuit 50.

Further, in the air-conditioning system 100 according to the present embodiment, the controller 61 invalidates the settings of the second setting unit 64 and the third setting unit 65 when the normal operation mode is set by the first setting unit 63.

According to the air-conditioning system 100 according to the present embodiment, when the normal operation mode is set by the first setting unit 63, the settings of the second setting unit 64 and the third setting unit 65 are ignored. Therefore, even if the error invalidation setting is forgotten be switched from being active to being non-active after the trial operation is completed, it is possible to prevent an error from being invalidated in the normal operation mode.

Further, in the air-conditioning system 100 according to the present embodiment, each of the first setting unit 63, the second setting unit 64, and the third setting unit 65 is a unit of a DIP switch.

Due to the air-conditioning system 100 according to the present embodiment, since the first setting unit 63, the second setting unit 64, and the third setting unit 65 are each a unit of a DIP switch, settings of each switching operation can be easily performed without using other devices for setting operation.

REFERENCE SIGNS LIST

1: air vent valve, 2: flow switch, 3: flow rate measuring device, 4: pressure measuring device, 10: outdoor unit, 11:

compressor, 12: flow passage switching valve, 13: outdoor heat exchanger, 14: expansion device, 15: outdoor fan, 20: relay unit, 20a: relay unit, 20b: relay unit, 21: intermediate heat exchanger, 22: pump, 23: bypass, 24: bypass pipe, 30: indoor unit, 31: indoor heat exchanger, 32: flow control device, 33: indoor fan, 40: refrigerant circuit, 41: refrigerant pipe, 50: water circuit, 51: water pipe, 60: control box, 61: controller, 62: setting unit, 63: first setting unit, 64: second setting unit, 65: third setting unit, 100: air-conditioning system, 211: first heat transfer unit, 212: second heat transfer unit

The invention claimed is:

1. An air-conditioning system comprising:
   a heat source side unit configured to heat or cool refrigerant;
   a use side unit configured to heat or cool water,
   a relay unit configured to cause heat exchange to be performed between the refrigerant and the water;
   a refrigerant circuit in which the heat source side unit and the relay unit are connected by a refrigerant pipe to allow the refrigerant to circulate;
   a water circuit in which the use side unit and the relay unit are connected by a water pipe to allow the water to circulate;
   a controller configured to operate in a trial operation mode in which a trial operation is performed when the refrigerant circuit or the water circuit is installed, and configured to operate in a normal operation mode in which a normal operation is performed;
   a first setting unit configured to switch the trial operation mode and the normal operation;
   a second setting unit configured to switch a target for the trial operation in the trial operation mode between the refrigerant circuit and the water circuit; and
   a third setting unit configured to switch activation and non-activation of invalidation of an error indicating an abnormal state,
   wherein the controller is configured to
   invalidate an error that occurs in the water circuit when the trial operation mode is set by the first setting unit, a target for the trial operation in the trial operation mode is set to the refrigerant circuit by the second setting unit, and invalidation of an error is set to be active by the third setting unit, and
   invalidate an error that occurs in the refrigerant circuit when the trial operation mode is set by the first setting unit, a target for the trial operation in the trial operation mode is set to the water circuit by the second setting unit, and invalidation of an error is set to be active by the third setting unit.

2. The air-conditioning system of claim 1, wherein, when the normal operation mode is set by the first setting unit, the controller is configured to invalidate the settings of the second setting unit and the third setting unit.

3. The air-conditioning system of claim 1, wherein each of the first setting unit, the second setting unit and the third setting unit is a unit of DIP switch.

* * * * *